US008804552B2

(12) United States Patent
Olsson

(10) Patent No.: US 8,804,552 B2
(45) Date of Patent: Aug. 12, 2014

(54) TOPOLOGICAL LOCATION DISCOVERY IN AN ETHERNET NETWORK

(75) Inventor: Jonathan Olsson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 354 days.

(21) Appl. No.: 13/147,273

(22) PCT Filed: Feb. 5, 2009

(86) PCT No.: PCT/SE2009/050117
§ 371 (c)(1), (2), (4) Date: Aug. 1, 2011

(87) PCT Pub. No.: WO2010/090561
PCT Pub. Date: Aug. 12, 2010

(65) Prior Publication Data
US 2011/0286337 A1   Nov. 24, 2011

(51) Int. Cl.
  *G01R 31/08* (2006.01)
  *G06F 11/00* (2006.01)
  *G08C 15/00* (2006.01)
  *H04J 1/16* (2006.01)
  *H04J 3/14* (2006.01)
  *H04L 1/00* (2006.01)
  *H04L 12/26* (2006.01)
  *H04W 4/00* (2009.01)

(52) U.S. Cl.
  USPC ........ 370/252; 370/241.1; 370/245; 370/248; 370/328

(58) Field of Classification Search
  None
  See application file for complete search history.

(56) References Cited

U.S. PATENT DOCUMENTS

| | | |
|---|---|---|
| 2002/0143905 A1 | 10/2002 | Govindarajan et al. |
| 2005/0099954 A1 | 5/2005 | Mohan et al. |
| 2006/0133299 A1 | 6/2006 | Son et al. |
| 2006/0256733 A1 | 11/2006 | Bejerano |
| 2008/0112331 A1* | 5/2008 | Long et al. ............ 370/245 |
| 2008/0298258 A1 | 12/2008 | Susilo et al. |
| 2009/0234969 A1* | 9/2009 | Mohan et al. ............ 709/242 |
| 2011/0063992 A1* | 3/2011 | Weng et al. ............ 370/252 |

FOREIGN PATENT DOCUMENTS

EP   1770904 A1   4/2007

OTHER PUBLICATIONS

International Search Report for PCT/SE2009/050117 mailed Oct. 7, 2009.

* cited by examiner

*Primary Examiner* — Faruk Hamza
*Assistant Examiner* — Diane Lo
(74) *Attorney, Agent, or Firm* — Patent Portfolio Builders PLLC

(57) ABSTRACT

A topology aware entity, such as an OSS (Operations Support System), an NMS (Network Management System) or an RM (Resource Manager), associated with an Ethernet network is configured to execute a method for topological location discovery of nodes that are added to the network. According to the method, the topology aware entity receives (step 30) a notification about a new node that has been added to the network. Then, the topology aware entity causes (step 31) an existing node to initiate a path discovery to the new node using an Ethernet Connectivity and Fault Management, CFM, protocol, such as IEE 802.1 ag or ITU-T Y.1731. The topology aware entity receives (step 32) the resulting path data from the existing node and identifies (step 33), based on the path data, a topological position of the new node in the Ethernet network. The method may be embodied as Identify topological position of new program instructions stored on a computer-readable medium.

19 Claims, 2 Drawing Sheets

TOPOLOGICAL LOCATION DISCOVERY IN AN ETHERNET NETWORK

TECHNICAL FIELD

The present invention generally relates to discovery, configuration and provisioning of network devices in Ethernet networks. More particularly, and not by way of any limitation, the present invention is directed to a technique for automatic topological location discovery of network devices that are added to an Ethernet network.

BACKGROUND

Ethernet is a widely used family of frame-based computer networking technologies for local area networks (LANs). It defines a number of wiring and signaling standards for the Physical Layer of the OSI networking model, through means of network access at the Media Access Control (MAC)/Data Link Layer, and a common addressing format. Ethernet is standardized by the organization IEEE, currently under IEEE 802.

Ethernet-based networks expand beyond traditional geographical boundaries and the number of users grows rapidly. Thus, there is also a significant increase in the number of network devices or nodes used in these networks. Each network device that is added to an Ethernet network needs to be configured and have services provisioned to it. This procedure is associated with an operating expenditure.

To correctly configure a new network device, the network administrator needs to be aware of where, topologically and geographically, the new device is located. There may also be a need to configure the OSS (Operations Support System) and/or NMS (Network Management System) with the new network device. This becomes a time consuming and tedious task that opens the door to human error and additional operating expenditures.

Discovery, configuration, and provisioning of new network devices can be performed manually, e.g. by having a technician go to the field to configure the new network device, and possibly also the OSS/NMS, via a CLI (Command-Line Interface) or GUI (Graphical User Interface). Alternatively, some level of automation can be achieved by applying non-standardized methods. However, the proprietary methods are often restricted to a particular vendor.

Clearly, manual update of topology aware entities/systems associated with Ethernet networks is error prone and time consuming, and is especially difficult during a large network rollout.

SUMMARY

It is an object of the invention to at least partly overcome one or more of the above-identified limitations of the prior art.

This and other objects, which may appear from the description below, are at least partly achieved by means of a method, a computer-readable medium, and a topology aware entity according to the independent claims, embodiments thereof being defined in the dependent claims.

According to a first aspect, there is provided a method in a topology aware entity associated with an Ethernet network. The method comprises the steps of receiving a notification about a new node that has been added to the network, and causing an existing node to initiate a path discovery to the new node using an Ethernet Connectivity and Fault Management, CFM, protocol. The method further comprises the steps of receiving resulting path data from the existing node, and identifying, based on the path data, a topological position of the new node in the Ethernet network.

The method according to the first aspect enables automatic topological position discovery of new nodes that are added the Ethernet network. It thus allows the topology aware entity to maintain up-to-date information about the actual network topology. The method can be implemented on any type of topology aware entity, such as an Operations Support System (OSS), a Network Management System (NMS) or a Resource Manager (RM).

The method uses a path discovery mechanism available through an Ethernet CFM protocol, such as IEE802.1ag or ITU-T Y.1731. Such Ethernet CFM protocols are standardized and widely deployed in Ethernet devices, and the path discovery mechanism is thus generally available within any Ethernet network. This will facilitate deployment of the method and reduce the risk of non-compliance within the network.

It is understood from the above that the method may be used to limit or eliminate the need for manual discovery of topological position and for manual configuration of topology aware entities. Thereby, the risk for human error can be decreased and the operating expenditure may be lowered.

By the same token, the method may ease deployment of new nodes, since the topological position of any such nodes can be automatically discovered by the topology aware entity. The thus-discovered topological position may then be used for the purpose of resource management and/or service provisioning.

Furthermore, since the method can be automatic, it may be used within Self Organizing Network (SON) solutions, in which a topology aware entity can be configured to adapt automatically and rapidly as nodes are added to the network, move within the network or vanish from the network.

In one embodiment, the new node is instantiated with a Maintenance End Point, MEP, that is part of an Ethernet CFM domain, e.g. a specific Maintenance Association (MA). In such an embodiment, the notification about the new node may comprise identification data that identifies the Maintenance End Point in the Ethernet CFM domain. Thereby, the topology aware entity receives information that allows it to direct the path discovery mechanism to the MEP of the new node in the appropriate Ethernet CFM domain. The identification data may include the MAC Address of the new node, or at least enable the existing node to obtain this MAC address. Suitably, the identification data is provided to the existing node.

In one embodiment, the existing node is defined as a Maintenance End Point, MEP, that is part of the Ethernet CFM domain. This will enable the path discovery to be carried out via the standardized Linktrace mechanism to determine the path taken to the MAC address of the new node within the Ethernet CFM Domain.

In one embodiment, the existing node is caused to send Loopback messages to the new node, before initiating the path discovery. This will allow the MAC address of the new node to be learned by intermediary nodes in the CFM Domain, which may serve to speed up the subsequent path discovery.

In one embodiment, the path data resulting from the path discovery includes at least one Linktrace Reply, LTR. Typically, the path data includes one LTR for each intermediate node in the relevant CFM Domain, as well as an LTR from the new node. Preferably, each LTR is indicative of the port ID and MAC address of the originating node, i.e. the node that sent the respective LTR. By processing the received LTR(s), the topology aware system is thus able to determine the topological position of the new node in the network.

In all embodiments, the topological position that is identified by the method based on the path data may include the logical position and/or the physical position of the new node in the network.

In all embodiments, the notification may be received from a node configuration system, such as an Auto Configuration Server. The node configuration system may be based on a standardized protocol, such as TR-069, or on any available proprietary protocol, and is suitably arranged to provide basic configuration information to the new node. The new node may automatically connect to the node configuration system for proper configuration in the Ethernet network. Since the node configuration system can be automatically informed about the presence of the new node, it may be appropriate to use the node configuration system for notifying the topology aware entity about the new node.

According to a second aspect, there is provided a computer-readable medium comprising program instructions which, when executed by a processor, cause the processor to perform the method of the first aspect.

According to a third aspect, there is provided a topology aware entity associated with an Ethernet network. The topology aware entity comprises means for receiving a notification about a new node that has been added to the network, and means for causing an existing node to initiate a path discovery to the new node using an Ethernet Connectivity Fault Management, CFM, protocol. The topology aware entity further comprises means for receiving path data from the existing node, and means for identifying, based on the path data, a topological position of the new node in the Ethernet network.

The computer-readable medium and the topology aware entity according to the second and third aspects enable the same effects and advantages as the method according to the first aspect. It is also to be understood that the different embodiments described in relation to the first aspect, and the associated advantages and effects, are equally applicable to the second and third aspects.

Still other objectives, features, aspects and advantages of the present invention will appear from the following detailed description, from the attached claims as well as from the drawings.

BRIEF DESCRIPTION OF THE DRAWINGS

Example embodiments of the invention will now be described in more detail with reference to the accompanying schematic drawings.

DETAILED DESCRIPTION

Figure 1A:
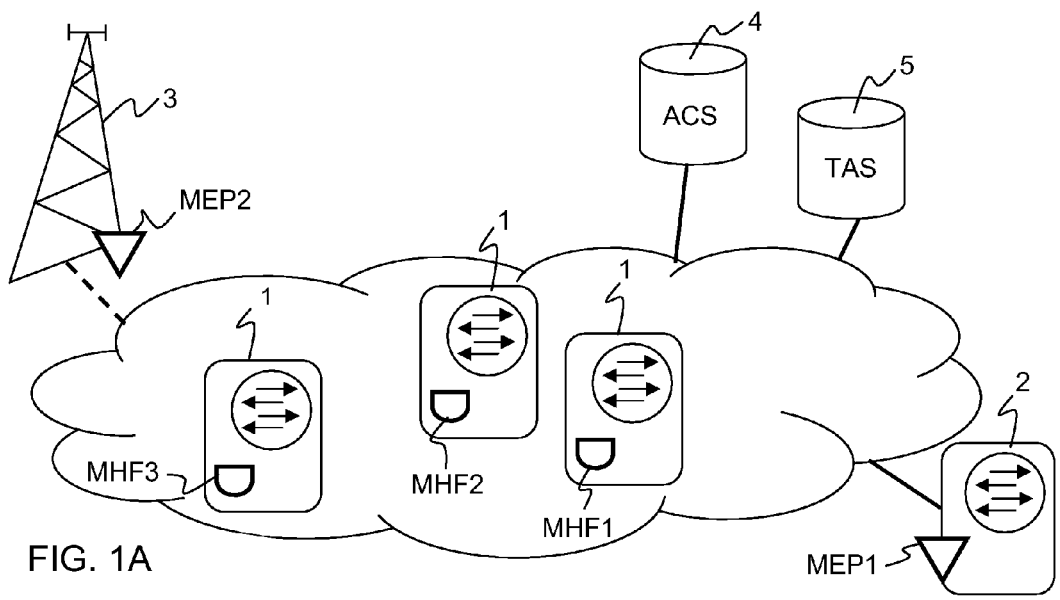
FIG. 1A illustrates an Ethernet network and its configuration according to an embodiment.

The description starts out by briefly introducing standards for Operations, Administration and Management (OAM) in Ethernet networks. Then, an example embodiment is presented for automatic and scalable topological location discovery of new nodes/network devices, which are added to existing Ethernet networks, based on the standardized mechanism IEEE802.1ag. Throughout the description, the same reference numerals are used to identify corresponding elements.

In order to adapt the Ethernet technology in a carrier-grade service environment, various standards have been and are being developed to provide advanced OAM capabilities (also referred to as Ethernet Connectivity and Fault Management or Ethernet CFM) across the entire network from one end to the other end. Since the end-to-end service network environment is typically comprised of a patchwork of diverse component networks (e.g., metro access networks and core networks using a variety of technologies) that may belong to different organizations, network operators and service providers, the Ethernet CFM is based on a hierarchically layered domain space wherein specific CFM domains (or, synonymously OAM domains) are defined corresponding to the constituent network infrastructure and provisioning. In particular, two standards, IEEE 802.1ag and ITU-T Y.1731, incorporated by reference herein, that are specifically concerned with end-to-end Ethernet CFM define a customer-level domain at the highest level of hierarchy, which comprises one or more provider domains (occupying an intermediate level), each of which in turn includes one or more operator domains disposed at a lower hierarchical level. By way of standardization, the CFM domain space may be partitioned into a number of levels, e.g., 8 levels, each domain corresponding to a particular level, wherein a domain is defined in terms of what are referred to as flow points. In the context of the IEEE 802 specification suite, the flow points are new entities contained in the Media Access Control (MAC) "interfaces" and "ports" as defined in related standards documentation. A port can implement multiple flow points of different types. The flow points are generally referred to as ETH flow points and bound either a "Maintenance End Point" or MEP compound function or a "Maintenance Intermediate Point" or MIP compound function. Typically, the MEP compound functions are disposed at the edge of a CFM domain whereas the MIP compound functions are disposed inside a domain and remain visible to the bounding MEP functions. A node may implement a MIP function, a MEP function, or both, depending on how the domains are configured. Accordingly, the terms "MEP node" and "MIP node" may be used to loosely define a node functionality that implements a MEP compound function and a node functionality that implements a MIP compound function, respectively, although they may be defined on one single node. Whereas MEP "nodes" are used by system administrators to initiate and monitor CFM activity (by issuing appropriate CFM frames, also denoted OAM PDUs (Protocol Data Units) in IEEE 802.1ag), MIP "nodes" passively receive and respond to CFM flows initiated by MEP "nodes".

A CFM domain having one or more MIP nodes may be bounded by a plurality of MEP nodes. In order that CFM frame flows are appropriately filtered so that they are processed only by the intended domain's nodes, the MEP/MIP population of an Ethernet CFM network is configured appropriately. For instance, in accordance with the current standards, an integer value may be provided to indicate a specific domain level of an Ethernet CFM hierarchy.

In IEEE 802.1ag, the CFM domains are denoted Maintenance Domains (MDs), each MD being identified by an MD Name and comprising one or more Maintenance Domain Levels (MD Levels). On each MD level, one or more Maintenance Associations (MA) are defined, with each MA being identified by an MAID that consists of the MD Name and an MA Name. Each MA is bounded by a set of MEPs.

ITU-T Y.1731 is a compatible CFM extension. In this standard, there are no MDs. Here, the CFM Domains are formed by MAs, which are denoted Maintenance Entity Groups (MEGs). The aforesaid MAID is denoted MEGID, and the MD Level is denoted MEG Level.

Embodiments of the present invention capitalize on Ethernet CFM to enable a Topology Aware System (TAS) to update its information about the topology of the network whenever a new node is added to the relevant network. In this context, the new node may be added to the network over a longer time, or may be attached to the network only for a limited period of time. The TAS may, e.g., be an Operations Support System (OSS), a Network Management System (NMS) or a Resource Manager (RM), which are well known to the skilled person.

FIG. 1A illustrates an exemplary Ethernet network comprising managed bridges 1, 2 with IEEE 802.1ag capabilities. The network is configured with an MA that is used for the purpose of location discovery. It should be understood that this MA could be configured and used for other purposes as well. The MA may be based on the default values for MEPs and MIPs, e.g. MD Level 0, MA Name "default", and virtual local area network identifier (VLAN ID) 0. Alternatively, the MA may be configured otherwise, e.g. to use a dedicated MA Name, MD Level or VLAN ID. All downlink ports on intermediate bridges 1 are configured with MIP Half Functions (MHF) on the appropriate MD Level. Uplink ports may also be configured with such MHFs for greater accuracy. In the example of FIG. 1A, only one MHF is defined or instantiated per intermediary node, the individual MHFs being denoted MHF1, MHF2 and MHF3, respectively.

FIG. 1A also illustrates an end station 3 in the form of a radio base station which is about to be added to the network (indicated by dashed line). Further, as shown in FIG. 1A, an Auto Configuration Server, ACS 4 is associated with the network. In this example, the ACS 4 is defined according to the standard TR-069, which is a Broadband Forum (formerly DSL Forum) technical specification entitled CPE WAN Management Protocol (CWMP). It defines an application layer protocol for remote management of end-user devices. Using TR-069, network devices can get in contact with the ACS 4 and automatically retrieve basic configuration information.

The ACS 4 is also configured to communicate with a TAS 5 which is associated with the network. The TAS 5 is an entity that, among other things, maintains an updated record of the physical and logical topology of the network.

The TAS 5 is further configured to communicate with a bridge 2 at the edge of the network, as will be described in the following. This bridge 2 is instantiated with an MEP in the MA used for location discovery. In the illustrated example, the bridge 2 is instantiated with a Down MEP (denoted MEP1) on the network facing port.

Figure 1B:
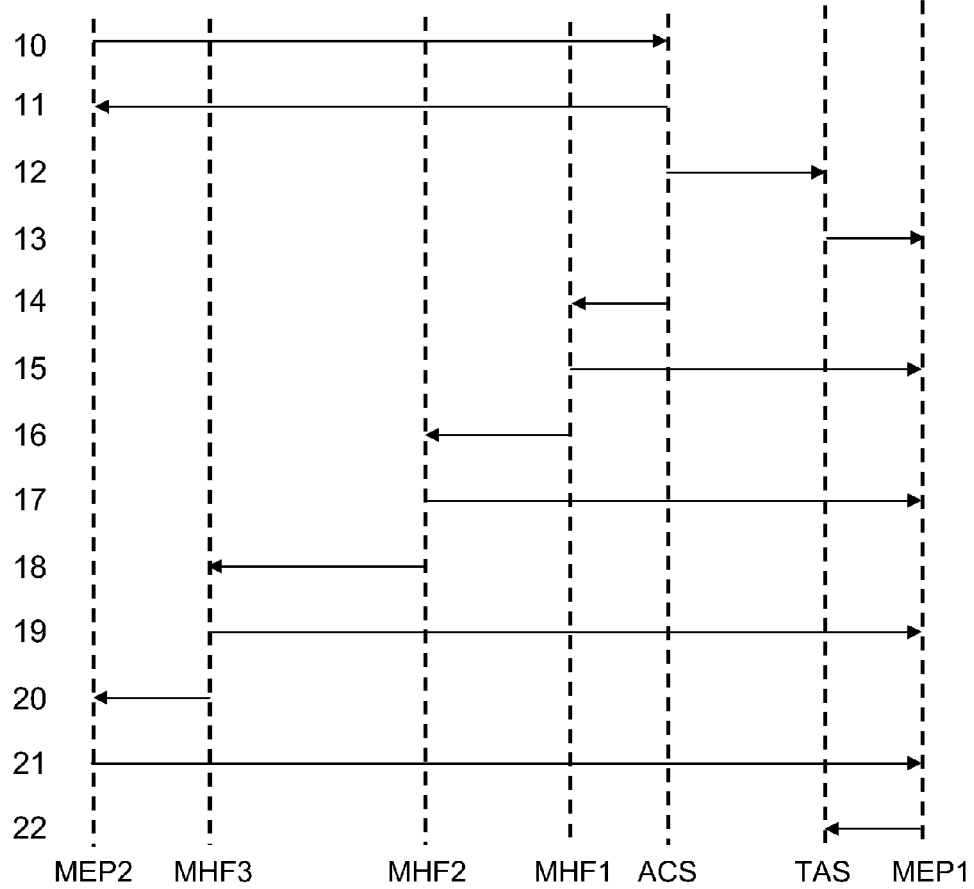
FIG. 1B is a signaling diagram illustrating a process for node location discovery in the network of FIG. 1A.

FIG. 1B is a signaling diagram illustrating a process of steps 10-23 for discovering the topological location of the end station 3, when the station 3 is added to the Ethernet network in FIG. 1A. In the following, it is assumed that the TAS 5 has obtained, using any suitable method, knowledge about the physical and logical topology of the network as it is arranged before the end station 3 is added to the network. It is also assumed that the end station 3 has obtained the address of the ACS 4, in any suitable way, e.g. via a DHCP (Dynamic Host Configuration Protocol) IP address procurement process.

Further, it is assumed that each intermediary bridge 1 comprises a Linktrace Responder which serves all MHFs and MEPs in the respective bridge. Similarly, the end station 3 is presumed to comprise such a Linktrace Responder, which may be instantiated before or during the process (e.g. in step 11 below). Each Linktrace Responder, as defined in IEEE 802.1ag, is responsible for processing and forwarding LTMs (Linktrace Messages), and for replying to them with LTRs (Linktrace Replies). An LTM at a particular MD Level is forwarded as an ordinary multicast data frame unit until it encounters an MEP at equal or higher MD Level, or an MHF at an equal MD Level. After receiving and processing the LTM, the Linktrace Responder can return an LTR and forward at most one altered copy of the received LTM. It never forwards an LTM past an MEP at the LTM's own MD Level or higher, i.e. a MEP that bounds the LTM's MA. An LTM carries an LTM TTL field that is decremented each time the LTM passes through a Linktrace Responder. The LTM is not forwarded if the TTL field is 0 when the LTM is received. The LTR is transmitted by the Linktrace Responder in response to a received LTM and returned in a unicast frame to the MEP Linktrace Initiator on the bridge that originated the LTM.

Returning to the process in FIG. 1B, in step 10, the end station 3 requests basic configuration information from the ACS 4, e.g. according to TR-069. In this or a preceding step, the ACS 4 is informed of the MAC address of the end station 3.

In step 11, the ACS 4 sends the basic configuration information to the end station 3, including a MEP ID, an MAID, an MD Level, a priority level and a VLAN ID. Optionally, if the end station 3 is to be configured to be untagged, the basic configuration information does not include priority level and VLAN ID. Thus, step 11 results in the end station 3 being instantiated with an MEP (MEP2 in FIG. 1A) in the appropriate MA. In this context, it should be noted that MEP2 is configured on the same MD level as MEP1 and MHF1-MHF3.

In step 12, the ACS 4 sends a notification message to the TAS 5 that the end station 3 has been configured. The notification message includes information about the configured end station 3, such as IP address, MAC address, MAID, MD Level and MEP ID.

In step 13, the TAS 5 requests the bridge 2 to initiate a Linktrace (LT) to MEP2. The Linktrace is a standardized procedure in IEEE802.1ag and is initiated by a Transmit Linktrace command. In the request, MEP2 may be identified by its MAC address. The request may be accomplished through an SNMP (Simple Network Management Protocol) command or an RPC (Remote Procedure Call).

In step 14, a MEP Linktrace Initiator on the bridge 2 (MEP1) sends an LTM frame with the Target MAC Address field set to the MAC address of MEP2, and the Original MAC Address field set to the MAC address of MEP1. The TTL field is set to a non-zero value that is suitable for the network where the location discovery is performed. The MAID and MD Level is the same as the MAID and MD Level configured by the ACS 4 in step 11.

Step 14 may optionally include a preparatory sub-step which is carried out by the bridge 2 before sending the LTM frame. In this sub-step, two or more Loopback messages (LBMs) are sent to MEP2 from a MEP Loopback Initiator associated with MEP1. By this sub-step, it is ensured that the intermediary nodes MHF1-MHF3 are informed about the MAC address of MEP2. This may speed up the subsequent Linktrace event.

In step 15, the Linktrace Responder associated with MHF1 processes the LTM frame. The Linktrace Responder replies to the LTM frame with an LTR frame, which includes a Reply Ingress TLV (Type-Length-Value) if MHF1 is configured as a Down MHF or a Reply Egress TLV (Type-Length-Value) if the MHF1 is configured as an Up MHF. Either TLV includes the port ID and MAC address of MHF1. The LTR frame will have the Destination MAC address set to the Original MAC Address field of the LTM frame, and the Source MAC Address field set to the MAC address of MHF1.

In step 16, the Linktrace Responder relays through MHF1 a modified LTM frame towards the egress port which is associated with the Target MAC address. The modified LTM frame is changed in so far as the TTL field is decremented by 1 and the Source MAC Address field is set to the MAC address of MHF1.

In step 17, the Linktrace Responder associated with MHF2 processes the LTM frame and replies with an LTR frame, which includes a Reply Egress/Ingress TLV that identifies the port ID and MAC address of MHF2, in the same way as described for step 15. The LTR frame will have the Destination MAC address set to the Original MAC Address field of the LTM frame and the Source MAC Address field set to the MAC address of MHF2.

In step 18, the Linktrace Responder relays through MHF2 a modified LTM frame towards the egress port which is associated with the Target MAC address. The modified LTM frame is changed in so far as the TTL field is decremented by 1 and the Source MAC Address field is set to the MAC address of MHF2.

In step 19, the Linktrace Responder associated with MHF3 processes the modified LTM frame and replies with an LTR frame, which includes a Reply Egress/Ingress TLV that identifies the port ID and MAC address of MHF3, in the same way as described for step 15. The LTR frame will have the Destination MAC address set to the Original MAC Address field of the LTM frame and the Source MAC Address field set to the MAC address of MHF3.

In step 20, the Linktrace Responder relays through MHF3 a modified LTM frame towards the egress port which is associated with the Target MAC address. The modified LTM frame is changed in so far as the TTL field is decremented by 1 and the Source MAC Address field is set to the MAC address of MHF3.

In step 21, the Linktrace Responder associated with MEP2 terminates the LTM sequence and replies with an LTR frame, in which the flag TerminalMEP is set to "true". The LTR frame may have the Destination MAC address set to the Original MAC Address field of the LTM frame and the Source MAC Address field set to the MAC address of MEP2. Optionally, the port ID and MAC address of MEP2 are included in an Ingress TLV in the LTR frame.

Each LTR that is received by the bridge 2 as a result of steps 15, 17, 19 and 21 triggers the creation of a new entry associated with a given LTM Transaction Identifier in a Linktrace database, which is accessible as a managed object through a Read Linktrace Reply command.

In step 22, the bridge 2 notifies the sequence of LTR frames to the TAS 5. Alternatively, the sequence of LTR frames may be provided by the bridge 2 on request by the TAS 5. For example, the request sent by TAS 5 to bridge 2 in step 13 may include an instruction for the bridge 2 to initiate a Read Linktrace Reply command when the Linktrace is completed and to send the response to the TAS 5. The Read Linktrace Reply command may reference MEP1 and the LTM Transaction Identifier returned by the Transmit Linktrace command.

It should be clear from the sequence diagram in FIG. 1B that the TAS 5 plays a key role in discovering the location of a new node or network device 3 that is added to the Ethernet network. An exemplary embodiment of the process in the TAS 5 is outlined in the flow chart of FIG. 2.

Initially, the TAS 5 (in step 30) receives a notification about a new node 3 that has been added to the network. This step may correspond to step 12 in FIG. 1B.

Upon receipt of the notification, the TAS 5 (in step 31) causes an existing node 2 to initiate a path discovery process for the new node 3, using a standardised Ethernet CFM protocol. This step may correspond to step 13 in FIG. 1B.

When the existing node 2 has completed the path discovery process, the TAS 5 receives (in step 32) the path data, resulting from the path discovery process, from the existing node 2. This step may correspond to step 22 in FIG. 1B.

Finally, in step 33, the TAS 5 processes the received path data to identify the exact topological position of the new node 3 in the network. The topological position may identify the position of the newly added node in the logical topology of the network, i.e. how the node is arranged in relation to the flow of data between the nodes in the network. Alternatively or additionally, the topological position may identify the position of the newly added node in the physical topology of the network, i.e. the links between the newly added node and existing nodes in the network. In this processing, the TAS 5 has access to information about the topology of the existing network, i.e. without the new node 3. For example, with path data in the form of a sequence of LTRs, the TAS 5 is capable of identifying the MHFs (e.g. via the MAC address stored in the Reply Ingress/Egress TLV of each LTR) that responded to the LTM frames. Further, since each MHF is associated to a particular device in the network and to a port on that device, the TAS 5 may be configured to step through the sequence of LTRs to isolate the last existing node in the network and the port thereof (e.g. via the port ID stored in the Reply Ingress/Egress TLV of the LTR) that the newly added node is connected to.

Figure 2:
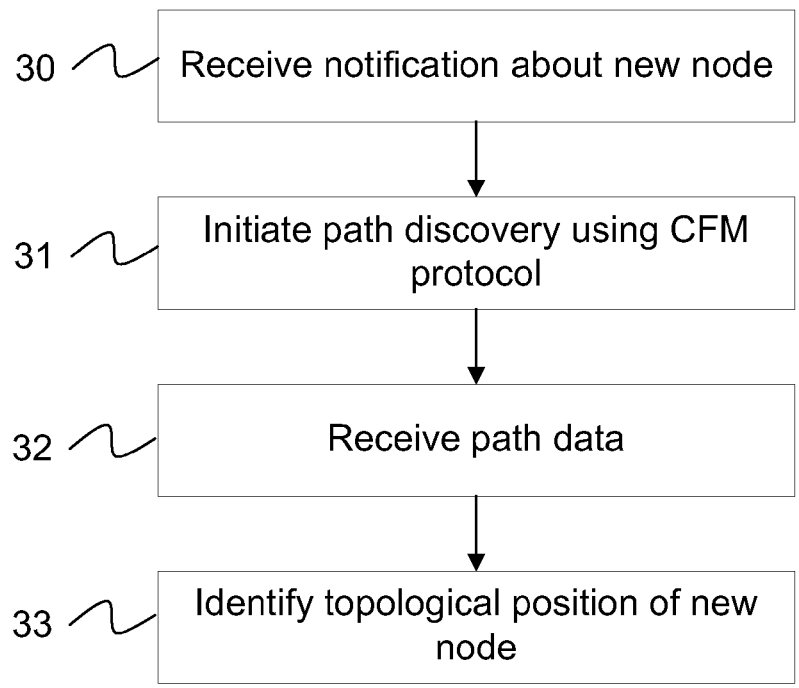
FIG. 2 is a flow chart of a method performed in a topology aware system according to an embodiment.

It should be realized that the process in FIG. 2 allows the TAS 5 to automatically discover the topological location of new network devices in an existing Ethernet network, without requiring the new network device to support any proprietary protocols for location discovery. Instead, the process for location discovery capitalizes on the CFM protocol, which involves widely deployed standards-based mechanisms and which is generally supported by network devices added to Ethernet networks. This enables the TAS to maintain an up-to-date view of the actual network topology. Further, the provision of the process in FIG. 2 also limits or eliminates the need for manual location discovery and configuration of the TAS, resulting in decreased risk for human error and lowering the operating expenditure. Further, a TAS operating according to the process in FIG. 2 will facilitate the deployment of new nodes, such as base stations or network extension nodes.

Figure 3:
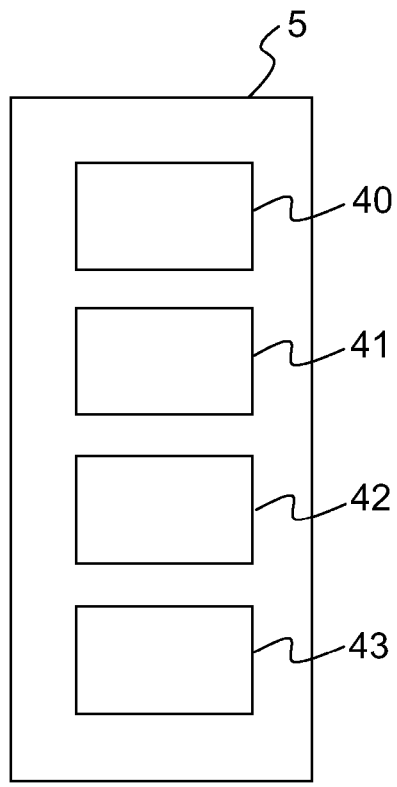
FIG. 3 is a block diagram of a topology aware system according to an embodiment.

FIG. 3 schematically shows a TAS configured to execute the process of FIG. 2. In the illustrated example, the TAS includes means 40 for receiving the above-mentioned notification, means 41 for causing an existing node to initiate a path discovery process, means 42 for receiving the resulting path data, and means 43 for processing the path data. The TAS may be implemented by special-purpose software (or firmware) run on one or more general-purpose or special-purpose computing devices. In this context, it is to be understood that each "means" of such an apparatus refers to a conceptual equivalent of a method step; there is not always a one-to-one correspondence between means and particular pieces of hardware or software routines. One piece of hardware sometimes comprises different means. For example, a processing unit serves as one means when executing one instruction, but serves as another means when executing another instruction. In addition, one means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The computing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device may include one or more communication interfaces, such as a serial interface, a parallel interface, a USB interface, a wireless interface, a network adapter, etc. One or more I/O devices may be connected to the computing device, via a communication interface, including e.g. a keyboard, a mouse, a touch screen, a display, a printer, a disk drive, etc. The special-purpose software may be provided to the computing device on any suitable computer-readable medium, including a record medium, a read-only memory, or an electrical carrier signal.

The invention has mainly been described above with reference to a few embodiments. However, as is readily appreciated by a person skilled in the art, other embodiments than the ones disclosed above are equally possible within the scope of the invention. The different features of the invention could be combined in other combinations than those described. The scope of the invention is defined and limited only by the appended patent claims.

For example, it is to be understood that the invention is useful for discovering the location of any suitable network device that is added to an Ethernet network. Thus, the added network device may be a base station or any type of CPE (Customer Premises Equipment), such as a gateway, a modem, a network interface device (NID), a Two Port MAC Relay (TPMR), an Ethernet bridge, an end-station, a wireless access point, etc.

Further, the invention could alternatively be implemented to use the CFM protocol according to ITU-T Y.1731, wherein path discovery is performed in an appropriate MEG, as is readily understood by the skilled person. Further, since ITU-T Y.1731 does not specify predefined TLVs in the LTR frames, but provides for optional TLVs, it may be advisable to configure these optional TLVs similarly to the predefined Egress/Ingress TLVs in IEEE 802.1ag (e.g. to include MAC address and port ID).

It should be understood that the reference to TR-069 is merely given by way of example, and that it is conceivable to use other standardized or proprietary protocols for remote management of end-user devices. Likewise, the ACS could be replaced by any node configuration system or server that is operable to remotely configure a node/network device in an Ethernet network.

It is also to be understood that any listing of the content of messages, replies, configuration information, etc, in the foregoing is only given for the purpose of exemplification, and that such listings are non-exhaustive in the given context.

Still further, it should be understood that each of the TAS and the ACS could be implemented by more than one physical device. It is also conceivable that the TAS and the ACS are implemented on one and the same physical device.

The invention claimed is:

1. A method in a topology aware entity associated with an Ethernet network, said method comprising the steps of:
   receiving a notification about a new node that has been added to the network wherein said topology aware entity is not an existing node of said Ethernet network;
   causing an existing node to initiate a path discovery to the new node using an Ethernet Connectivity and Fault Management, CFM, protocol;
   receiving path data from the existing node; and
   identifying, based on the path data, a topological position of the new node in the Ethernet network.

2. The method of claim 1, wherein the new node is instantiated with a Maintenance End Point, MEP, that is part of an Ethernet CFM domain, wherein said notification comprises identification data that identifies said Maintenance End Point in the Ethernet CFM domain.

3. The method of claim 2, wherein said step of causing comprises providing said identification data to the existing node.

4. The method of claim 2, wherein the existing node is defined as a Maintenance End Point, MEP, that is part of the Ethernet CFM domain.

5. The method of claim 4, wherein said step of causing comprises sending the existing node a request for a Linktrace to the new node.

6. The method of claim 1, wherein the existing node, before initiating the path discovery, is caused to send Loopback messages to the new node.

7. The method of claim 1, wherein said path data includes at least one Linktrace Reply, LTR.

8. The method of claim 1, wherein said topological position includes at least one of a logical position and a physical position.

9. The method of claim 1, wherein said notification is received from a node configuration system, such as an Auto Configuration Server.

10. A non-transitory computer-readable medium comprising program instructions which, when executed by a processor, cause the processor to perform the method of claim 1.

11. A topology aware entity associated with an Ethernet network, said topology aware entity comprising:
    means for receiving a notification about a new node that has been added to the network, the topology aware entity not comprising an existing node of said Ethernet network;
    means for causing an existing node to initiate a path discovery to the new node using an Ethernet Connectivity and Fault Management, CFM, protocol;
    means for receiving path data from the existing node; and
    means for identifying, based on the path data, a topological position of the new node in the Ethernet network.

12. The topology aware entity of claim 11, wherein the new node is defined as a Maintenance End Point, MEP, that is part of an Ethernet CFM domain, wherein said notification comprises identification data that identifies said Maintenance End Point in the Ethernet CFM domain.

13. The topology aware entity of claim 12, wherein said means for causing is configured to provide said identification data to the existing node.

14. The topology aware entity of claim 12, wherein the existing node is defined as a Maintenance End Point, MEP, that is part of the Ethernet CFM domain.

15. The topology aware entity of claim 14, wherein said means for causing is configured to send the existing node a request for a Linktrace to the new node.

16. The topology aware entity of claim 11, wherein said means for causing is configured to cause the existing node, before initiating the path discovery, to send Loopback messages to the new node.

17. The topology aware entity of claim 11, wherein said path data includes at least one Linktrace Reply, LTR.

18. The topology aware entity of claim 11, wherein said topological position includes at least one of a logical position and a physical position.

19. The topology aware entity of claim 11, wherein said means for receiving is configured to receive the notification from a node configuration system, such as an Auto Configuration Server.

* * * * *

UNITED STATES PATENT AND TRADEMARK OFFICE
CERTIFICATE OF CORRECTION

PATENT NO. : 8,804,552 B2  
APPLICATION NO. : 13/147273  
DATED : August 12, 2014  
INVENTOR(S) : Olsson Page 1 of 1

It is certified that error appears in the above-identified patent and that said Letters Patent is hereby corrected as shown below:

Title Page, Item (57), under "ABSTRACT", in Column 2, Lines 15-16,
delete "Identify topological position of new".

Signed and Sealed this
Ninth Day of June, 2015

Michelle K. Lee
*Director of the United States Patent and Trademark Office*